United States Patent
Hsiao et al.

(10) Patent No.: US 8,553,313 B2
(45) Date of Patent: Oct. 8, 2013

(54) ELECTROPHORISES DISPLAY UNIT AND ITS PRODUCTION METHOD

(75) Inventors: Po-Wen Hsiao, Hsinchu (TW);
Tzu-Ming Wang, Hsinchu (TW);
Kai-Cheng Chuang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 161 days.

(21) Appl. No.: 12/775,533

(22) Filed: May 7, 2010

(65) Prior Publication Data
US 2011/0148277 A1    Jun. 23, 2011

(30) Foreign Application Priority Data
Dec. 22, 2009   (TW) ................................ 98144283 A

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ........... 359/296; 345/107, 105; 204/450, 600; 430/32, 34, 38
See application file for complete search history.

(56) References Cited

U.S. PATENT DOCUMENTS

| 7,271,947 B2 * | 9/2007 | Liang et al. ................... 359/296 |
| 7,907,328 B2 * | 3/2011 | Aoki .............................. 359/296 |
| 2007/0054212 A1 * | 3/2007 | Akiyama et al. .............. 430/132 |
| 2008/0169197 A1 | 7/2008 | McRuer et al. |

FOREIGN PATENT DOCUMENTS

| CN | 1521550 A | 8/2004 |
| TW | 200415433 A | 8/2004 |
| TW | 200951597 A1 | 12/2009 |

OTHER PUBLICATIONS

China Official Action issued Jun. 26, 2012.
Taiwan Official Action issued on Jan. 29, 2013.

* cited by examiner

*Primary Examiner* — Tuyen Tra
(74) *Attorney, Agent, or Firm* — Chun-Ming Shih

(57) ABSTRACT

An electrophoretic display unit includes a substrate, a first electrode, a first insulation layer, a second electrode and a second insulation layer. The first electrode is disposed on the substrate. The first insulation layer is disposed on the first electrode. The second electrode is disposed on the first insulation layer. The second insulation layer is disposed on the second electrode. Wherein, the second insulation layer has an opening for appearing a part of the second electrode.

8 Claims, 4 Drawing Sheets

100

# ELECTROPHORISES DISPLAY UNIT AND ITS PRODUCTION METHOD

CROSS-REFERENCE TO RELATED APPLICATIONS

This application is based upon and claims the benefit of priority from the prior Taiwanese Patent Application No. 098144283, filed Dec. 22, 2009, the entire contents of which are incorporated herein by reference.

BACKGROUND

Field of the Invention

The present invention relates to a display. More particularly, the present invention relates to an electrophoretic display unit and its production method.

Most of conventional electrophoretic displays utilize voltage difference between top and bottom electrodes for driving particles within an electrophoretic layer to generate grayscale change. Along with the progress of electrophoretic display techniques, the requirement for grayscale change and response time grows higher and higher. Although the display performance can be increased by means of improving display materials or driving method, but the efficiency still has room to be improved. In color electrophoretic displays, the display panel includes at least a pixel with two kinds of particles, and a plurality of control electrodes between neighboring pixels. By means of applying a control voltage to an additional control electrode, for controlling distribution of different particles so as to change display images.

BRIEF SUMMARY

The present invention provides an electrophoretic display unit, which disposes a side electrode between top and bottom electrodes, making the electrophoretic display unit display more grayscale change.

The present invention also provides a method for producing an electrophoretic display unit, by means of roll to roll procedure to form an opening for appearing the side electrode, therefore, can greatly shorten production time, decrease photo-mask and further decrease production cost and improve productivity.

The present invention provides an electrophoretic display unit, which includes a substrate, a first electrode, a first insulation layer, a second electrode and a second insulation layer. The first electrode is disposed on the substrate. The first insulation layer is disposed on the first electrode. The second electrode is disposed on the first insulation layer. The second insulation layer is disposed on the second electrode. Wherein, the second insulation layer has an opening for appearing a part of the second electrode.

In an embodiment of the present invention, the electrophoretic display unit further includes a third electrode disposed on the second insulation layer.

In an embodiment of the present invention, the second electrode is disposed on a part of the first insulation layer.

In an embodiment of the present invention, the second insulation layer encloses a part of the second electrode.

In an embodiment of the present invention, an electrophoretic liquid is filled from the opening.

A production method for an electrophoretic display unit includes the following steps. First, providing a substrate having a first electrode and a first insulation layer. Next, disposing a second electrode on the first insulation layer. Next, disposing a second insulation layer on the second electrode. Next, forming an opening on the second insulation layer for appearing a part of the second electrode.

In the present invention introduces side electrode into the microcup of the display layer by means of roll to roll procedure, for controlling the motivation of the electrophoresis particles by voltage changes between the original two electrodes and the third electrode. Therefore, not only increases the response time by means of efficiently reducing moving distance of the particles and increases grayscale changes, but also greatly shortens the production time by means of utilizing roll to roll procedure, decreases photo-mask and further decreases production cost and improves productivity.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
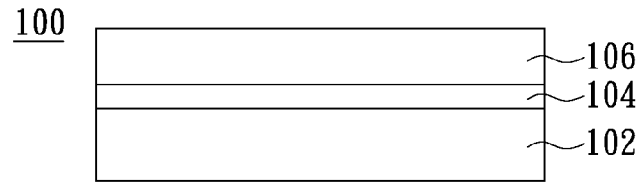
FIGS. 1A to 1F are schematic views shown producing procedures of an embodiment of the present invention

FIGS. 1A to 1D are schematic views shown producing procedures of an embodiment of the present invention. Referring to FIG. 1A, in the procedure of forming an electrophoretic display unit 100, a substrate 102 is provided, wherein the substrate 102 is of a flexible substrate.

In this embodiment, a first electrode 104 is disposed on the substrate 102, and for example, covers the entire substrate 102. The electrophoretic display unit 100 is for providing a first control voltage to the first electrode 104.

Figure 1B:
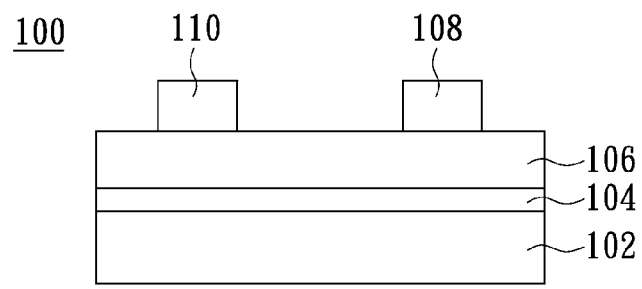

Then, a first insulation layer 106 is formed on the first electrode 104, and for example, covers the entire first electrode 104. Thereafter, as shown in FIG. 1B, two second electrodes 108 and 110 are disposed on the first insulation layer 106. The electrophorises display unit 100 is for providing the second control voltages to the second electrodes 108 and 110. In this embodiment, two second electrodes 108 and 110 are taken as example but the amount of the second electrodes is not limited.

In a preferred embodiment of the present invention, the second electrode 108 and 110 are respectively disposed on one part of the first insulation layer 106. The second electrodes 108 and 110 are, for example, transparent electrodes, and may be selected from Indium Tin Oxide (ITO), Indium Zinc Oxide (IZO), ZnO, InGaZnO (IGZO), Al or Cu.

In a preferred embodiment of the present invention, the second electrodes 108 and 110 may be, for example, formed by inkjet printing or optical lithography method, but is not limited.

Figure 1C:
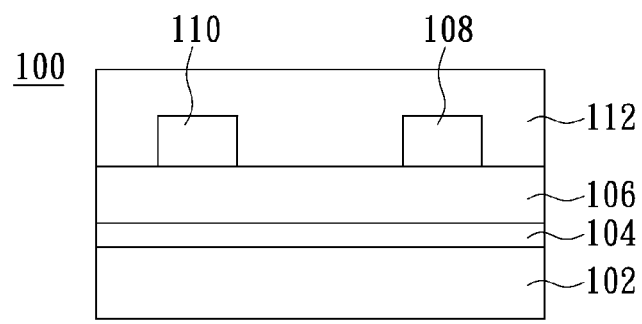

Referring to FIG. 1C, a second insulation layer 112 is disposed on the second electrodes 108 and 110, and on the first insulation layer 106 at a portion uncovered by the second electrodes 108 and 110. The second insulation layer 112 encloses the second electrodes 108 and 110, and covers the first insulation layer 106 at the portion uncovered by the second electrodes 108 and 110.

In a preferred embodiment of the present invention, the second insulation layer 112 may be, for example, of opacity insulation wall, and may be, for example, composed of resins polymerized by heat or by radiation. The second insulation layer 112 may be, for example, of the same material as the first insulation layer 106, but is not limited.

Figure 1D:
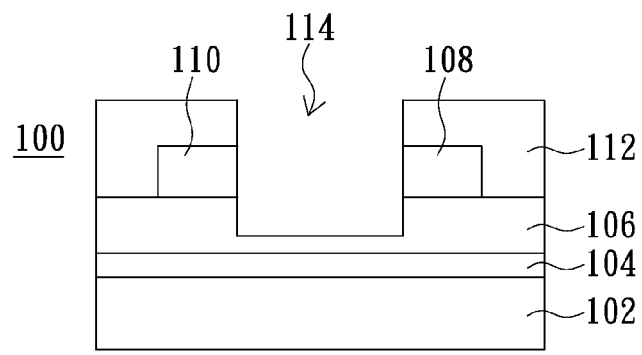

Referring to FIG. 1D, an opening 114 is formed on the second insulation layer 112 between the second electrodes 108 and 110 by roll to roll procedure. A depth of the opening 114 is, fox example, equal to or greater than a depth of the second insulation layer 112. In addition, a width of the opening 114 may be a distance between the second electrodes 108 and 110, for appearing a part of the second electrodes 108 and 110 out of the opening 114.

In a preferred embodiment of the present invention, the opening 114 is formed by getting rid of unnecessary part of the second insulation layer 112 by means of roll to roll procedure.

Figure 1E:
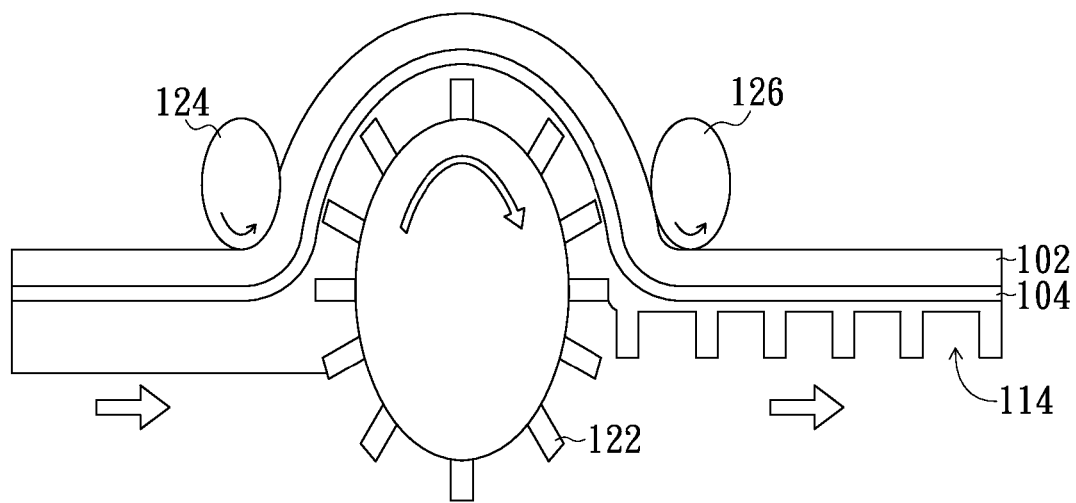

Referring to FIG. 1E, the roll to roll procedure is executed by a pressure wheel 122 and rolling wheels 124 and 126. In this embodiment, the electrophoretic display unit 100 displayed in FIG. 1D is rolled between the pressure wheel 122 and the rolling wheels 124 and 126. Then, take advantage of saw tooth of the pressure wheel 122, forming the opening 114 on the second insulation layer 112 of the electrophoretic display unit 100, thereby obtaining the electrophoretic display unit 100 of FIG. 1D.

Figure 1F:
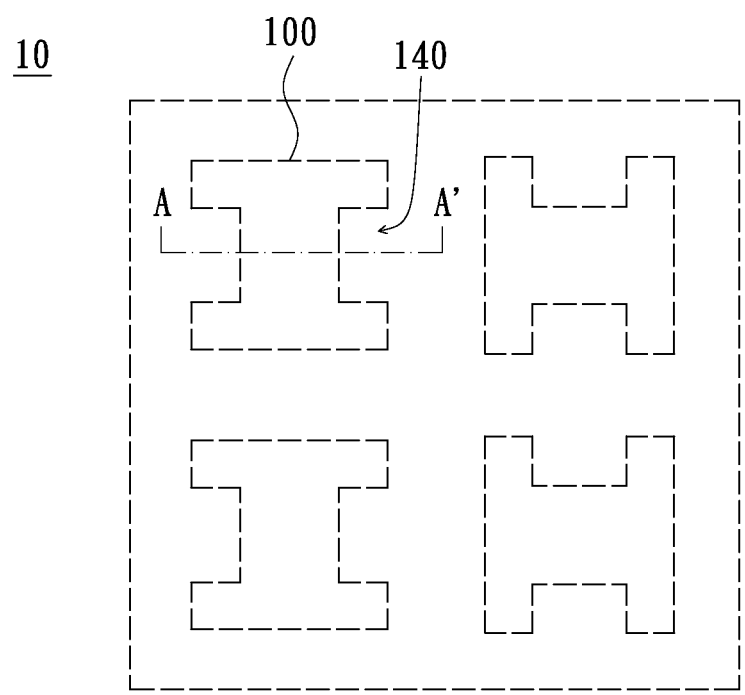

FIG. 1F is a top view of FIG. 1D. If FIG. 1F is cut along line A-A' and viewed from one side, FIG. 1D is obtained. Referring to FIG. 1F, the electrophoretic display 10 is composed by a plurality of electrophoretic display units 100. The electrophoretic display unit 100 may be of inverted H-shaped and the opening 114 is formed at the cutout of the H-shape.

Figure 2:
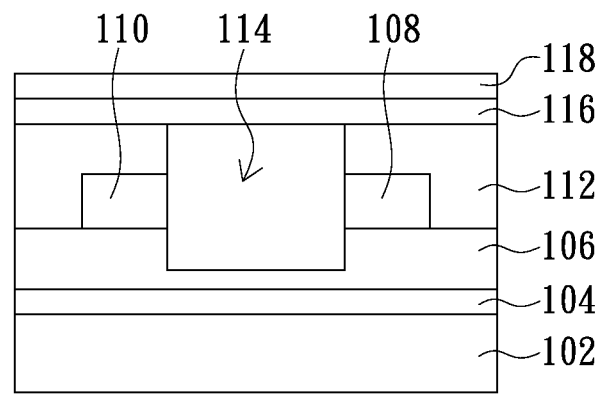
FIG. 2 is a side, cross sectional view of an embodiment of the electrophoretic display of the present invention.

In a preferred embodiment of the present invention, it is obvious for one skilled in the art to form the opening 114 by yellow light process technology, but is not limited. FIG. 2 is a side, cross sectional view of an embodiment of the electrophoretic display of the present invention. In this embodiment, after the opening 114 is formed, the electrophoretic display unit 100 may be considered as a microcup structure. Therefore, the electrophoretic liquid with the electrophoresis particles may be filled from the opening 114 and a sealing layer 116 may be disposed on the second insulation layer 112 to prevent the electrophoretic liquid from leakage.

Then, a third electrode 118 is disposed on the sealing layer 116 and the electrophoretic display unit 100 will provide a third control voltage to the third electrode 118.

In a preferred embodiment of the present invention, the first control voltage and the second control voltage have a voltage difference. The first control voltage and the third control voltage have a voltage difference, and the second control voltage and the third control voltage have a voltage difference.

Figure 3:
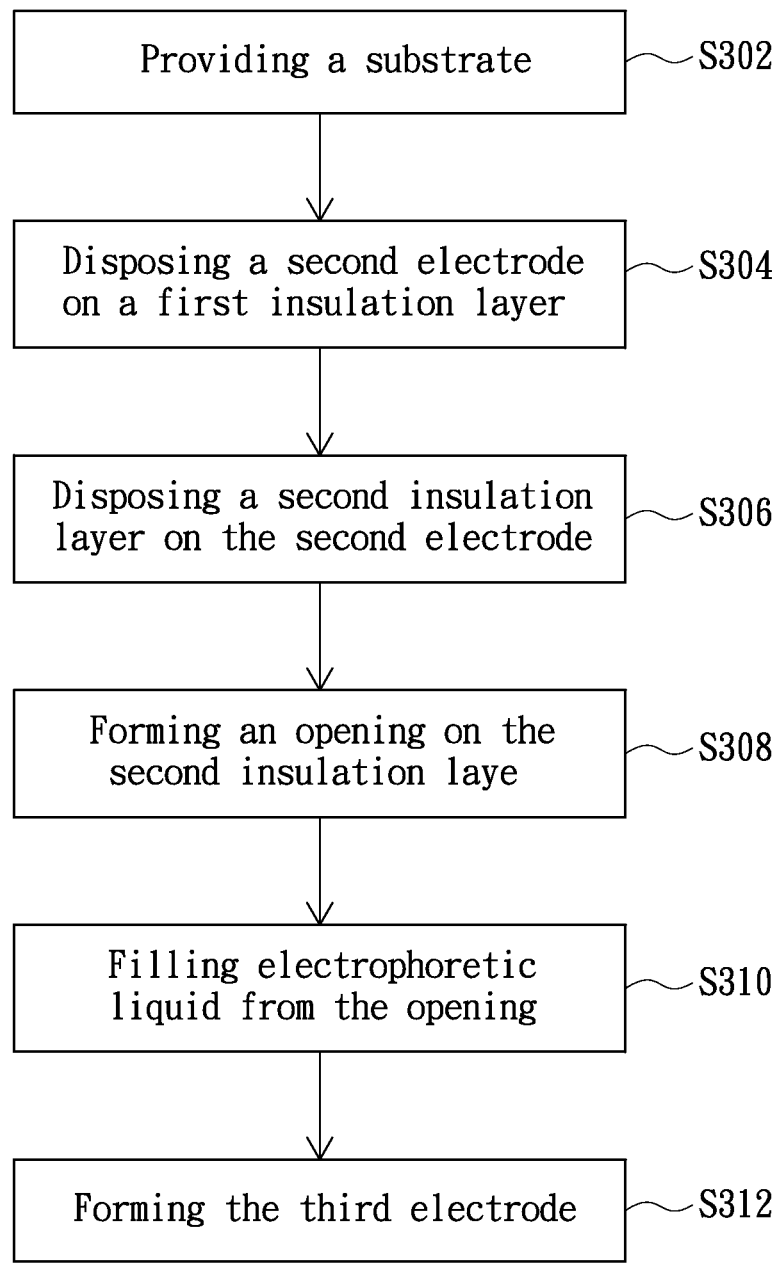
FIG. 3 is a flow chart of a production method of the electrophoretic display according to an embodiment of the present invention

FIG. 3 is a flow chart of a production method of the electrophoretic display according to an embodiment of the present invention. Referring to FIGS. 1A to 1D and FIG. 3, in this embodiment, a substrate 102 is provided at first (step S302). Next, a first electrode 104 is formed on the substrate 102 (Step 304). Next, a first insulation layer 106 is formed on the first electrode 104. Wherein, it is obvious for one skilled in the art, the first electrode 104 covers a top surface of the entire substrate 102. The first insulation layer 160 covers a top surface of the entire first electrode 104.

After step 304, the second electrodes 108 and 110 are formed on a part of the first insulation layer 106 (step S306). The method of forming the second electrodes 108 and 110 may be, for example, firstly forming a second electrode layer on a top surface of the first insulation layer 106 and then acquiring the second electrodes 108 and 110 by pattern procedure.

After the second electrodes 108 and 110 are acquired, a second insulation layer 112 is formed on the second electrodes 108 and 110 and on the first insulation layer 106 at the portion uncovered by the second electrodes 108 and 110 (Step S306). The second insulation layer 112 respectively encloses the second electrodes 108 and 110. That is, the second insulation layer 112 respectively contacts with the three surfaces of each of the second electrodes 108 and 110.

Next, the opening 114 is formed on the second insulation layer 112 by roll to roll procedure for respectively appearing one surface of the second electrodes 108 and 110 (Step S308). The width of the opening 114 is equal to the distance between the second electrodes 108 and 110, and the height of the opening 114 is at least equal to a distance between the top surface of the second insulation layer 112 and the top surface of the first insulation layer 106. In this embodiment, in the process of forming the opening 114, the height of the opening 114 is greater than the distance between the top surface of the second insulation layer 112 and the top surface of the first insulation layer 106.

Next, the electrophoretic liquid with the electrophoresis particles is filled in the electrophoretic display unit from the opening 114 (Step S310), and the sealing layer 116 is formed on the other parts of the second insulation layer 112. Finally, the third electrode is formed 118 on the sealing layer 116 (Step S312). In the embodiment, the sealing layer 116 is disposed on a top surface of the other parts of the second insulation layer 112 and seals the opening 114.

In the present invention, the electrophoretic display and its production method, introduces side electrode into the microcup of the display layer by means of roll to roll procedure, for controlling the motivation of the electrophoresis particles by voltage changes between the original two electrodes and the third electrode. Therefore, not only increases the response time by means of efficiently reducing moving distance of the particles and increases grayscale changes, but also greatly shortens the production time by means of utilizing roll to roll procedure, decreases photo-mask and further decreases production cost and improves productivity.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. An electrophoretic display unit comprising:
a substrate;
a first electrode disposed on the substrate;
a first insulation layer disposed on the first electrode;
at least a second electrode disposed on the first insulation layer;
a second insulation layer disposed on the second electrode, wherein the second insulation layer has an opening for appearing a part of the second electrode, so that the at least second electrode acts as at least a side electrode, and the at least second electrode is disposed at the middle of a side wall of the opening;

wherein a depth of the opening is greater than a depth of the second insulation layer; and a third electrode disposed on the second insulation layer, wherein the third electrode, the first electrode and the at least second electrode are used for controlling the motion of electrophoretic particles within the opening.

2. The electrophoretic display unit of claim 1, wherein the second electrode is disposed on a part of the first insulation layer.

3. The electrophoretic display unit of claim 1, wherein a part of the second electrode is covered by the second insulation layer.

4. The electrophoretic display unit of claim 1, wherein the opening is filled with electrophoretic liquid.

5. A production method for an electrophoretic display unit comprising:

providing a substrate, the substrate having a first electrode and a first insulation layer;

disposing at least a second electrode on the first insulation layer;

disposing a second insulation layer on the second electrode;

forming an opening on the second insulation layer for appearing a part of the second electrode, so that the at least second electrode acts as at least a side electrode wherein the at least second electrode is disposed at the middle of a side wall of the opening;

wherein a depth of the opening is greater than a depth of the second insulation layer; and disposing a third electrode on the second insulation layer, so that the motion of electrophoretic particles within the opening is controlled by the first electrode, the at least second electrode and the third electrode.

6. The production method for the electrophoretic display unit of claim 5, wherein the second electrode is disposed on a part of the first insulation layer.

7. The production method for the electrophoretic display unit of claim 5, wherein the second insulation layer encloses a part of the second electrode.

8. The production method for the electrophoretic display unit of claim 5, wherein the opening is filled with an electrophoretic liquid.

* * * * *